United States Patent
Snodgrass

(10) Patent No.: US 8,139,624 B1
(45) Date of Patent: Mar. 20, 2012

(54) SYSTEM AND METHOD FOR PROVIDING MULTIPLE AD HOC COMMUNICATION NETWORKS ON A HARDWARE CHANNEL

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1535 days.

(21) Appl. No.: 11/211,888

(22) Filed: Aug. 25, 2005

(51) Int. Cl.
*H04L 27/00* (2006.01)

(52) U.S. Cl. ........ 375/219; 370/328; 370/337; 370/321; 370/334

(58) Field of Classification Search .................. 375/219; 370/328, 337, 321, 334
See application file for complete search history.

(56) References Cited

U.S. PATENT DOCUMENTS

| | | | |
|---|---|---|---|
| 5,719,868 A | 2/1998 | Young | 370/436 |
| 5,812,951 A * | 9/1998 | Ganesan et al. | 455/445 |
| 5,949,760 A | 9/1999 | Stevens et al. | 370/254 |
| 6,041,056 A * | 3/2000 | Bigham et al. | 370/395.64 |
| 6,317,436 B1 | 11/2001 | Young et al. | 370/443 |
| 6,331,973 B1 | 12/2001 | Young et al. | 370/337 |
| 6,487,186 B1 | 11/2002 | Young et al. | 370/336 |
| 6,504,829 B1 | 1/2003 | Young et al. | 370/337 |
| 6,515,973 B1 | 2/2003 | Young | 370/329 |
| 6,574,117 B1 | 6/2003 | Lebo | 361/801 |
| 6,574,199 B1 | 6/2003 | Young et al. | 370/254 |
| 6,574,206 B2 | 6/2003 | Young | 370/337 |
| 6,577,641 B1 | 6/2003 | Izumi | 370/442 |
| 6,580,730 B1 | 6/2003 | Loukianov | 370/522 |
| 6,594,273 B1 * | 7/2003 | McGibney | 370/442 |
| 6,600,754 B1 | 7/2003 | Young et al. | 370/459 |
| 6,628,636 B1 | 9/2003 | Young | 370/337 |
| 6,631,124 B1 | 10/2003 | Koorapaty et al. | 370/337 |
| 6,665,189 B1 | 12/2003 | Lebo | 361/730 |
| 6,711,177 B1 | 3/2004 | Young | 370/468 |
| 6,741,466 B1 | 5/2004 | Lebo | 361/687 |
| 6,747,866 B1 | 6/2004 | Lebo et al. | 361/679 |
| 6,791,994 B1 | 9/2004 | Young et al. | 370/436 |
| 6,801,513 B1 | 10/2004 | Gibbons et al. | 370/337 |

(Continued)

FOREIGN PATENT DOCUMENTS

EP 1548605 A1 * 6/2005

(Continued)

OTHER PUBLICATIONS

"The Software Defined Radio (SDR) in Network Centric Operations (NCO)" by Alan C. Trimble, Ph.D. being presented at the IEEE, Oct. 2005.

(Continued)

*Primary Examiner* — David C. Payne
*Assistant Examiner* — Tanmay Shah
(74) *Attorney, Agent, or Firm* — Donna P. Suchy; Daniel M. Barbieri

(57) ABSTRACT

A node for communicating with multiple ad hoc communication networks includes a first antenna configured to communicate in a first frequency band associated with a first ad hoc communication network and a second antenna configured to communicate in a second frequency band associated with a second ad hoc communication network. A transceiver is coupled to the first antenna and the second antenna. The transceiver is configured to transmit and receive messages. A control circuit is coupled to the transceiver and is configured to implement an access protocol having a time slot section. The access protocol is configured to switch communications in the time slot section between the first frequency band and the second frequency band.

20 Claims, 4 Drawing Sheets

U.S. PATENT DOCUMENTS

| | | |
|---|---|---|
| 6,810,022 B1 | 10/2004 | Young .................... 370/280 |
| 6,816,562 B2 | 11/2004 | Atkinson et al. ............. 376/39 |
| 2001/0048691 A1* | 12/2001 | Chang et al. ............... 370/442 |
| 2002/0067709 A1 | 6/2002 | Yamada et al. ............. 370/337 |
| 2002/0122406 A1* | 9/2002 | Chillariga et al. ........... 370/347 |
| 2003/0115369 A1 | 6/2003 | Walter et al. ............... 709/253 |
| 2003/0165155 A1 | 9/2003 | Johnson et al. ............. 370/442 |
| 2004/0057407 A1 | 3/2004 | Balachandran et al. ...... 370/336 |
| 2004/0125784 A1 | 7/2004 | Lee et al. .................... 370/345 |
| 2004/0131025 A1* | 7/2004 | Dohler et al. ............... 370/328 |
| 2004/0152478 A1 | 8/2004 | Ruohonen et al. ........... 455/502 |
| 2006/0063511 A1* | 3/2006 | Shima et al. ................ 455/410 |
| 2006/0164303 A1* | 7/2006 | Jacquinot .............. 343/700 MS |
| 2006/0178116 A1* | 8/2006 | Qi et al. ..................... 455/90.3 |

FOREIGN PATENT DOCUMENTS

JP          09168104 A   *   6/1997

OTHER PUBLICATIONS

U.S. Appl. No. 10/198,361 entitled "Ruggedized Electronics Sub-System Module" and having inventor Steve I. Lebo.

U.S. Appl. No. 10/197,737 entitled "Ruggedized Electronics Module Cooling System" and having inventors Steve I. Lebo and Scott J. Sellner.

U.S. Appl. No. 10/229,941 entitled "Modular Communication Platform" and having inventor Richard D. Spring, Timothy E. Snodgrass, Robert R. Jakoubek and Steve I. Lebo.

U.S. Appl. No. 11/199,545 entitled "Low Power, Programmable Modem for Software Defined Radio Applications" and having inventor Timothy E. Snodgrass, which is filed on the same day herewith.

U.S. Appl. No. 11/199,451 entitled "System and Method for Net Formation and Merging In Ad Hoc Networks" and having inventor Timothy E. Snodgrass, which is filed on the same day herewith.

U.S. Appl. No. 11/199,440 entitled "Improved Net Formation-Merging System and Method" and having inventor Timothy E. Snodgrass and James A. Stevens, which is filed on the same day herewith.

U.S. Appl. No. 11/199,426 entitled System and Method for Thermal Load Sharing Between Nodes in a Communications Network' and having inventor Timothy E. Snodgrass, which is filed on the same day herewith.

* cited by examiner

SYSTEM AND METHOD FOR PROVIDING MULTIPLE AD HOC COMMUNICATION NETWORKS ON A HARDWARE CHANNEL

FIELD OF THE INVENTION

The invention relates generally to communication networks and in particular, to a system and method for implementing multiple multi-channel ad hoc networks on a single hardware channel.

BACKGROUND OF THE INVENTION

Wireless communication networks may be used for numerous applications including tactical military and commercial applications. A structured wireless channel access scheme such as Time Division Multiple Access (TDMA) may be used in an ad hoc wireless network. TDMA is a channel access technique in which a frequency channel is divided into time slots and each time slot is assigned to a user. Accordingly, multiple transmissions may be supported on a single frequency channel. In particular, a multi-frequency (or multi-channel) time division multiple access format such as Orthogonal Domain Multiple Access (ODMA) may be utilized. Multi-channel time-division multiple access is the subject of U.S. Pat. Nos. 5,949,760; 6,317,436; 6,331,973; 6,487,186; 6,504,829; 6,515,973; 6,574,199; 6,574,206; 6,600,754; 6,628,636 and 6,711,177, the disclosure of which are herein incorporated by reference. The allocation of channel resources in a multi-channel ad hoc network may be provided by a protocol configured to choose time slots and channels that do not cause collisions so neighboring nodes may transmit without interference. For example, the Unifying Slot Assignment Protocol (USAP) may be used to monitor the RF environment and allocate the channel resources on demand. USAP is the subject of U.S. Pat. No. 5,719,868, the disclosure of which is herein incorporated by reference.

In an exemplary military application of a wireless multi-channel ad hoc network, military vehicles (e.g., tanks, trucks, airplanes, etc.) may include radios that act as nodes in the wireless communication network. One type of radio is a software defined radio (SDR). In certain applications, it may be desirable to split operation of the radio (or node) in completely different frequency bands or networks. For example, in terrestrial ground mobile communications a node (or radio) may need to be involved in a high capacity network in a first frequency band (e.g., in the UHF band) for short range communications and local Situational Awareness (SA) and also need to be involved in a second communications channel in a second frequency band (e.g., in the HF band, the VHF band, SATCOM, etc.) for reach-back. Typically, when operation in multiple frequency bands is required, a separate complete hardware channel is used for each frequency band. The use of separate complete hardware channel, however, may be costly.

There is a need, therefore, for a system and method for implementing multiple multi-channel ad hoc networks on a single hardware channel. In particular, there is a need for a system and method for dual- or multi-frequency band operation on one hardware channel. Accordingly, it would be desirable to provide a system and method that enables the interoperation of non-similar propagation channels on one set of hardware.

SUMMARY OF THE INVENTION

In accordance with one embodiment, a node for communicating with multiple ad hoc communication networks includes a first antenna configured to communicate in a first frequency band associated with a first ad hoc communication network, a second antenna configured to communicate in a second frequency band associated with a second ad hoc communication network, a transceiver coupled to the first antenna and the second antenna and configured to transmit and receive messages and a control circuit coupled to the transceiver and configured to implement an access protocol having a time slot section, the access protocol configured to switch communications in the time slot section between the first frequency band and the second frequency band.

In accordance with another embodiment, a node for communicating with multiple ad hoc communication networks includes an antenna configured to communicate in a first frequency band associated with a first ad hoc communication network and to communicate in a second frequency band associated with a second ad hoc communication network, a transceiver coupled to the antenna and configured to transmit and receive messages and a control circuit coupled to the transceiver and configured to implement an access protocol having a time slot section, the access protocol configured to switch communications in the time slot section between the first frequency band and the second frequency band.

In accordance with another embodiment, a wireless communications network includes at least one node configured to communicate in a first frequency band and a second frequency band and a multi-channel time division multiple access structure including a time slot section and configured to switch communications in the time slot section between the first frequency band and the second frequency band.

BRIEF DESCRIPTION OF THE DRAWINGS

The invention will be more readily understood by reference to the following description taken with the accompanying drawings, in which.

DETAILED DESCRIPTION OF THE PREFERRED EMBODIMENTS

Figure 1:
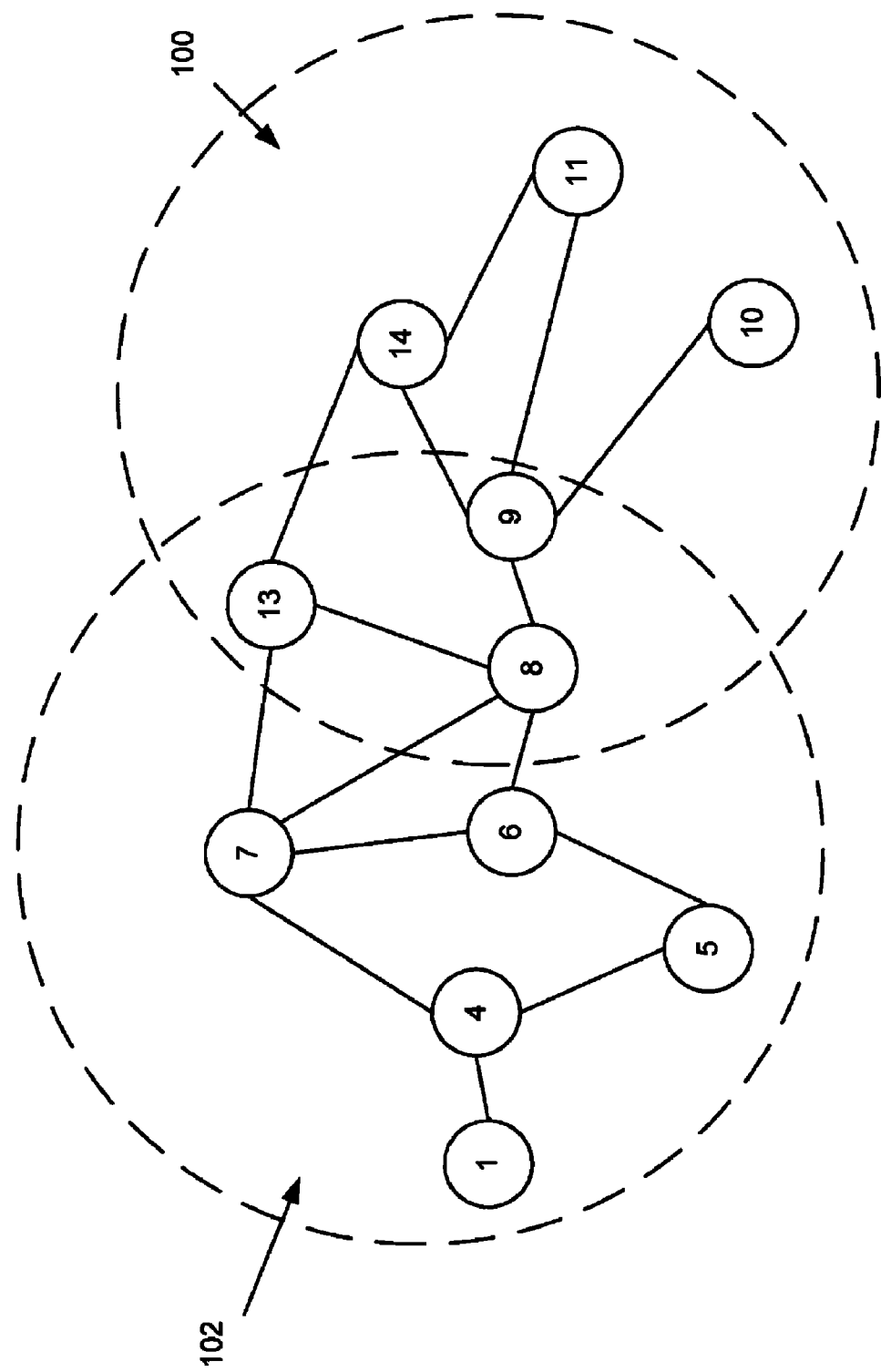
FIG. 1 is a diagram of wireless communications networks having a plurality of nodes in accordance with an embodiment.

Before describing in detail the particular improved system and method, it should be observed that the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

FIG. 1 is a diagram of wireless communication networks including a plurality of nodes in accordance with an embodiment. In an exemplary embodiment, wireless communication network 100 and wireless communication network 102 may be a Joint Tactical Radio System (JTRS) or other ad hoc wireless network. Nodes 1 through 14 may be, for example, a ground based node (e.g., a radio in a tank or other military vehicle), an airborne based node, a naval based node, or other appropriate platform and may be capable of ground-to-air communications, air-to-ground communications, ground-to-ground communications, etc. Each node in network 100 and each node in network 102 may be a software defined radio (SDR). Preferably, each node in network 100 and each node in network 102 communicates in accordance with a multi-channel TDMA format such as Orthogonal Domain Multiple Access (ODMA).

Network 100 is configured to operate in a first frequency band and network 102 is configured to operate in a second frequency band. For example, the frequency band may be the high frequency (HF) band, the very high frequency (VHF) band, the ultra high frequency (UHF) band or other appropriate frequency band. In an exemplary embodiment, network 100 may be configured for UHF communications and network 102 may be configured for HF, VHF or SATCOM communications. For example, network 100 may operate in the UHF band for short range communication and local Situational Awareness (SA) and network 102 may operate in the HF band, VHF band or SATCOM for reach back communications. In another exemplary embodiment, network 100 may operate a modern waveform such as a TDMA version of VHF Wide Band Networking Waveform and network 102 may operate a UHF version with different properties. In FIG. 1, nodes 8, 9 and 13 are configured to support dual- or multi-band operation in order to communicate with other nodes in both network 100 and network 102. Accordingly, nodes 8, 9 and 13 are each configured to implement two multi-channel ad hoc networks, i.e., one network in the first frequency band (e.g., UHF communications) and one network in the second frequency band (e.g., VHF or SATCOM communications). Each of nodes 8, 9 and 13 is also configured to enable multi-band operation on one set of hardware (i.e., a single hardware channel).

Figure 2A:
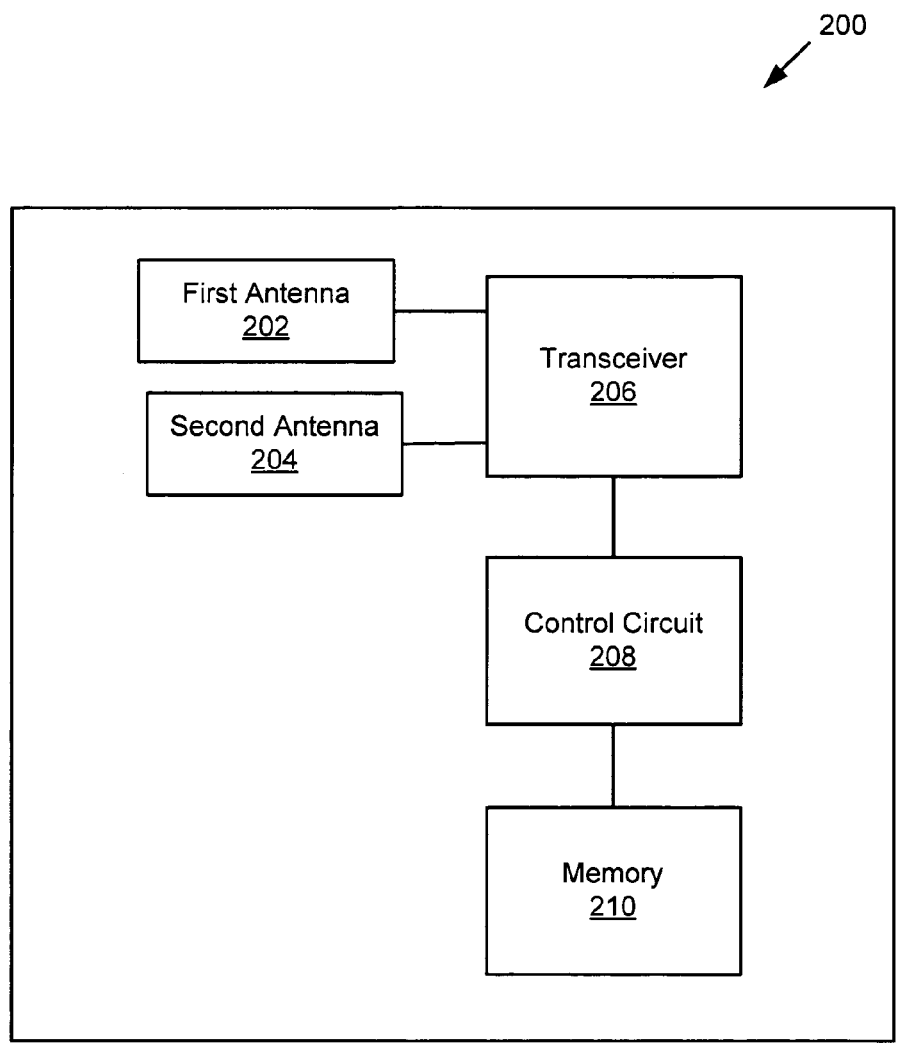
FIG. 2A is a schematic block diagram of a node in a wireless communications network having a single hardware channel for multiple as hoc networks in accordance with an embodiment.

FIG. 2A is a schematic block diagram of a node in a wireless communications network having a single hardware channel configured for dual-band operation in accordance with an embodiment. In an exemplary embodiment, node 200 is a radio in a military vehicle, such as a software defined radio. Node 200 includes a first antenna 202, a second antenna 204, a transceiver 206, a control circuit 208 and a memory 210.

Figure 2B:
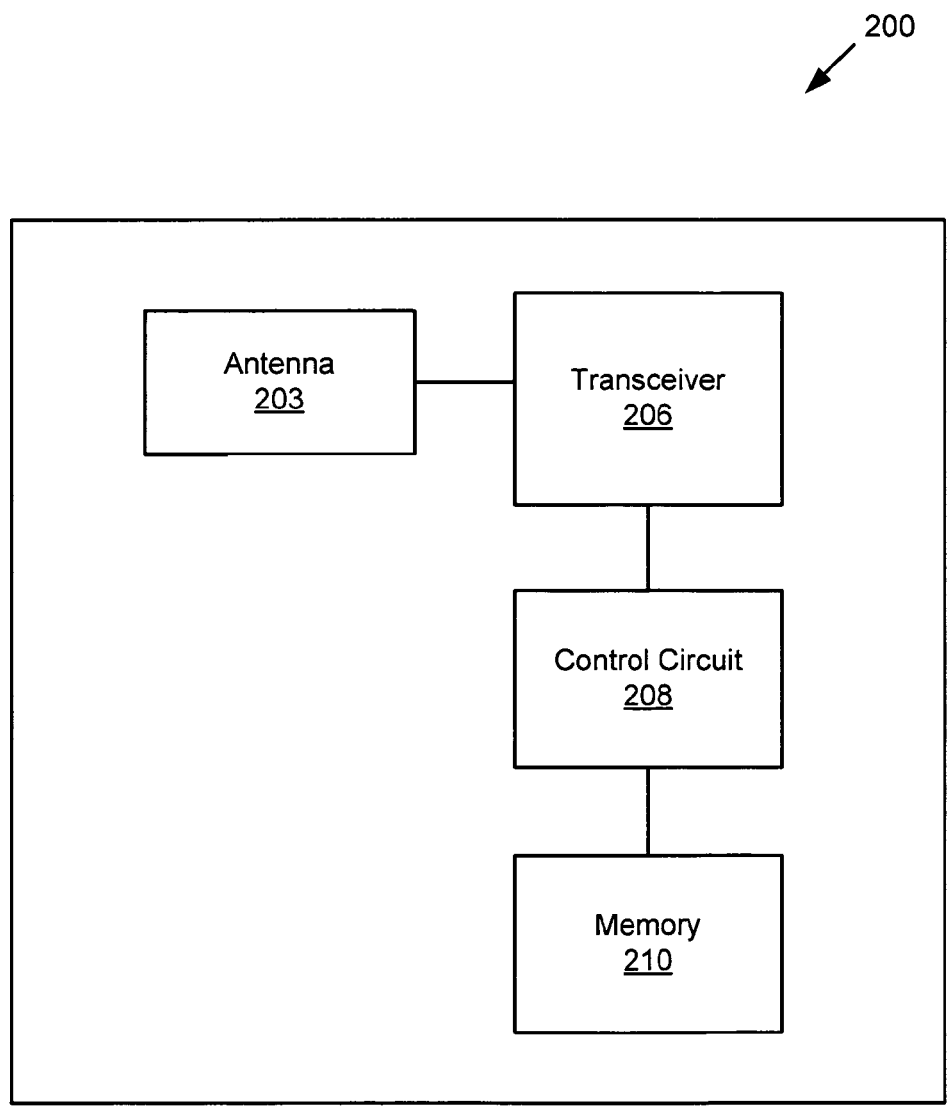
FIG. 2B is a schematic block diagram of a node in a wireless communications network having a single hardware channel for multiple as hoc networks in accordance with an alternative embodiment.

Transceiver 206 is coupled to first antenna 202, second antenna 206 and control circuit 208. Transceiver 206 includes transmit and receive circuitry and is configured to communicate with (e.g., receive signals from and transmit signals to) other nodes in a communications network via either first antenna 202 or second antenna 204. First antenna 202 is configured to receive and transmit signals in a first frequency band (e.g., the frequency band associated with network 100) and second antenna 204 is configured to receive and transmit signals in a second frequency band (e.g., the frequency band associated with network 102). In an alternative embodiment shown in FIG. 2B, a tunable antenna 202 may be used to transmit and receive signals in both the first frequency band and the second frequency band. As mentioned above, the frequency band may be the high frequency (HF) band, the very high frequency (VHF) band, the ultra high frequency (UHF) band or other appropriate, frequency band.

Control circuit 208 is coupled to transceiver 206 and memory 210. Control circuit 208 may include various types of control circuitry, digital and/or analog, and may include a microprocessor, microcontroller, application specific integrated circuit (ASIC), or other digital and/or analog circuitry configured to perform various input/output, control, analysis, and other functions described herein. Memory 210 includes volatile and/or non-volatile memory to, for example, store a computer program or software to perform the functions described herein. Control circuit 208 may execute sequences of instructions contained in memory 210. In an exemplary embodiment, node 200 is configured to communicate in an ad hoc manner using a structured wireless channel access scheme such as TDMA and in particular using a multi-channel TDMA format such as ODMA. Slot assignments may be coordinated using, for example, Unifying Slot Assignments Protocol (USAP). Accordingly, control circuit 208 is configured to implement an access protocol (e.g., ODMA) in order to transmit and receive messages with other nodes via transceiver 206 and antennas 202, 204.

Figure 3:
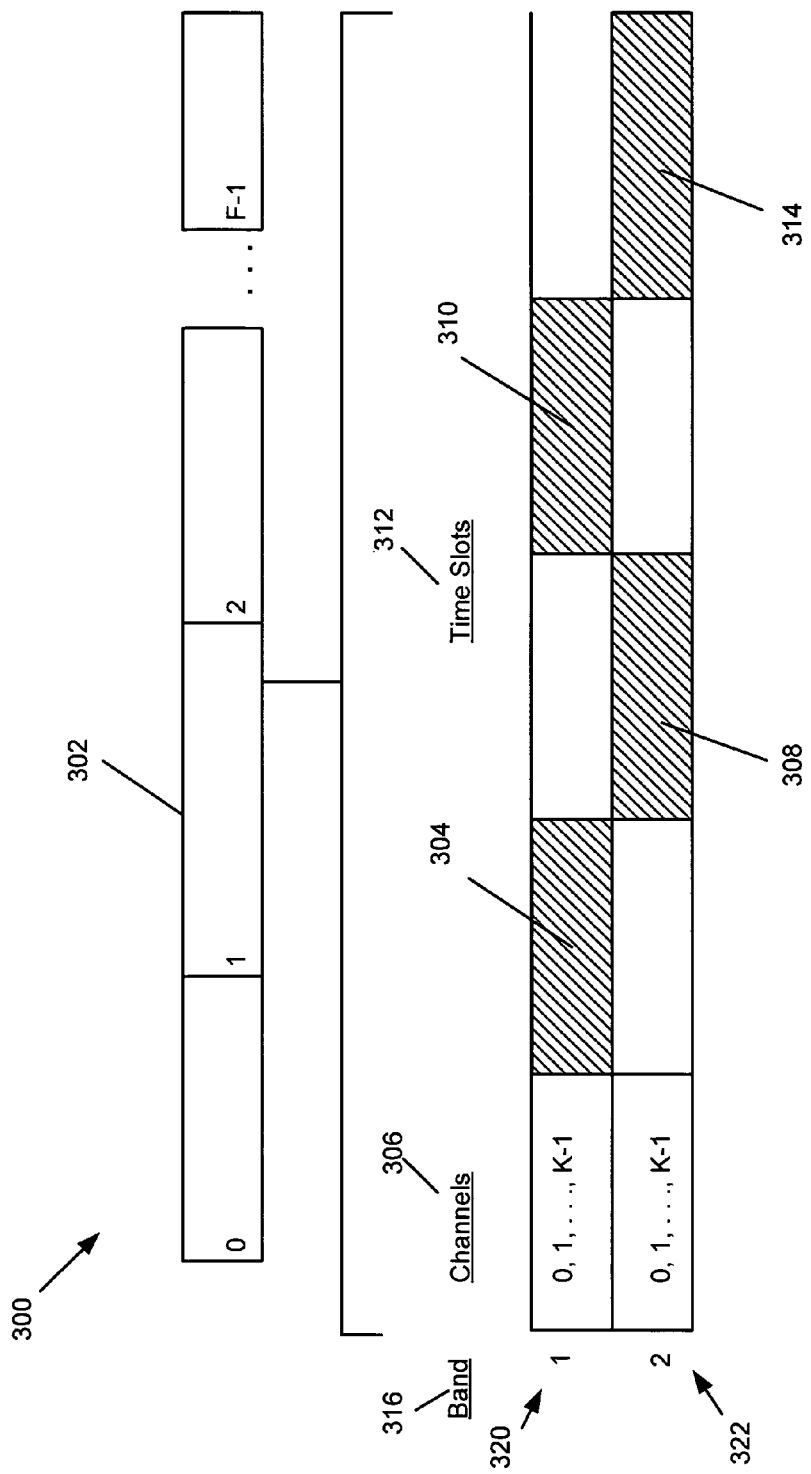
FIG. 3 is a diagram of a multi-channel TDMA structure in accordance with an embodiment.

FIG. 3 is a diagram of a multi-channel TDMA structure in accordance with an embodiment. Multi-channel TDMA structure 300 includes a plurality of frames 302 that are associated with a plurality of non-overlapping radio frequency channels 306 in a first frequency band 320 and a second frequency band 322. Each frame includes time slots 312 during which a node may transmit or receive information. Each frame may include various types of time slots such a synch slots, bootstrap slots, user traffic slots, etc. which may be used to transmit and receive information such as slot assignment information, identification information, status information, user traffic (e.g., data, messages), etc.

TDMA structure 300 is configured for multi-band operation between the first frequency band 320 and the second frequency band 322. TDMA structure 300 is configured to interleave time slots 304, 310 of the first frequency band 320 with time slots 308, 314 of the second frequency band 322. For example, the time slots of one frequency band waveform Signal In Space may be interleaved with the time slots of another frequency band waveform Signal In Space. Accordingly, TDMA structure 300 is configured to switch operation between the first frequency band 320 and the second frequency band 322. In an exemplary embodiment, a certain percentage of time slots 312 may be allocated to the first frequency band 320 and a certain percentage of time slots 312 may be allocated to the second frequency band 322. For example, 60% of time slots 312 may be allocated to the VHF frequency band and 40% of time slots 312 may be allocated to the UHF frequency band. In an alternative embodiment, TDMA structure 300 may be configured to rapidly switch back and forth between time slots for the two frequency bands (e.g., a few time slots at the VHF frequency band and then a few time slots at the UHF frequency band, etc.).

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The systems and methods depicted and described are not limited to the precise details and conditions disclosed. Furthermore, other substitutions, modifications, changes, and omissions may be made in the design and arrangement of the exemplary embodiments without departing from the scope of the invention as expressed in the appended claims.

What is claimed is:

1. A military radio node for communicating with multiple ad hoc communication networks, the node comprising:

a first antenna configured to communicate in a first frequency band associated with a first ad hoc communication network, the first frequency band being one of a Satcom band, a UHF band, or an HF band, the first frequency band being for reach back communications;

a second antenna configured to communicate in a second frequency band associated with a second ad hoc communication network, the second frequency band being one of a Satcom band, or a VHF band, the second frequency band being for local situational awareness;

a transceiver coupled to the first antenna and the second antenna and configured to transmit and receive messages in the first frequency band for reach back communications and messages in the second frequency band for situational awareness; and a control circuit coupled to the transceiver and configured to implement an access protocol having a time slot section, the access protocol configured to switch communications in the time slot section between the first frequency band and the second frequency band.

2. A node according to claim 1, wherein the access protocol is a multi-channel time division multiple access protocol.

3. A node according to claim 2, wherein the multi-channel time division multiple access protocol is an orthogonal division multiple access protocol.

4. A node according to claim 1, wherein the time slot section comprises a plurality of time slots configured to transmit and receive information.

5. A node for communicating with multiple ad hoc communication networks, the node comprising:

a first antenna configured to communicate in a first frequency band associated with a first ad hoc communication network, the first frequency band being one of a Satcom band, a UHF band, a VHF Band, or an HF band;

a second antenna configured to communicate in a second frequency band associated with a second ad hoc communication network, the second frequency band being one of a Satcom band, a UHF band, a VHF band, or an HF band, wherein the first frequency band is different than the second frequency band;

a transceiver coupled to the first antenna and the second antenna and configured to transmit and receive messages, and a control circuit coupled to the transceiver and configured to implement an access protocol having a time slot section, the access protocol configured to switch communications in the time slot section between the first frequency band and second frequency band, wherein the time slot section comprises a plurality of time slots configured to transmit and receive information, wherein a first portion of the plurality of time slots is assigned to communicate in the first frequency band and a second portion of the plurality of time slots is assigned to communicate in the second frequency band.

6. A node according to claim 1, wherein the node comprises a single hardware channel.

7. A node according to claim 1, wherein the node is a software defined radio.

8. A node for communicating with multiple ad hoc communication networks, the node comprising:

an antenna configured to communicate in a first frequency band associated with a first ad hoc communication network, the first frequency band being one of a Satcom band, a VHF band, a UHF band or an HF band and to communicate in a second frequency band associated with a second ad hoc communication network, the second frequency band being one of a Satcom band, a UHF band, a VHF band, or an HF band, wherein the first frequency band is different than the second frequency band;

a transceiver coupled to the antenna and configured to transmit and receive messages; and a control circuit coupled to the transceiver and configured to implement an access protocol having a time slot section, the access protocol configured to switch communications in the time slot section between the first frequency band and the second frequency band, wherein the time slot section comprises a plurality of time slots for transmitting and receiving information, wherein a first portion of the plurality of time slots is assigned to communicate in the first frequency band and a second portion of the plurality of time slots is assigned to communicate in the second frequency band.

9. A node according to claim 8, wherein the antenna is a tunable antenna.

10. A node according to claim 8, wherein the access protocol is a multi-channel time division multiple access protocol.

11. A node according to claim 10, wherein the multi-channel time division multiple access protocol is an orthogonal division multiple access protocol.

12. A node according to claim 1, wherein the time slot section comprises a plurality of time slots configured to transmit and receive information.

13. A node according to claim 12, wherein a first portion of the plurality of time slots is assigned to communicate in the first frequency band and a second portion of the plurality of time slots is assigned to communicate in the second frequency band.

14. A node according to claim 8, wherein the node comprises a single hardware channel.

15. A node according to claim 8, wherein the node is a software defined radio.

16. A wireless communications network, comprising:

at least one node configured to communicate in a first frequency band and a second frequency band, wherein the first frequency band and the second frequency band each being one of a UHF band, a VHF band, or an HF band, wherein the first frequency band is different than a second frequency band; and a multi-channel time division multiple access structure including a time slot section and configured to switch communications in the time slot section between the first frequency band and the second frequency band, wherein the time slot section includes a plurality of time slots and a first portion of the plurality of time slots is assigned to communicate in the first frequency band and a second portion of the plurality of time slots is assigned to communicate in the second frequency band.

17. A wireless communication network according to claim 16, wherein the at least one node comprises a single hardware channel.

18. A wireless communication network according to claim 16, wherein the multi-channel time division multiple access structure is an orthogonal division multiple access protocol.

19. A wireless communication network according to claim 16, wherein the first-frequency band is a VHF band and the second frequency band is an HF band.

20. A wireless communication network according to claim 16, wherein the at least one node is a software defined radio.

* * * * *